United States Patent [19]

Schwarzschild

[11] 4,411,535
[45] Oct. 25, 1983

[54] PROBE FOR CLINICAL ELECTRONIC THERMOMETER

[75] Inventor: Jack Schwarzschild, Stamford, Conn.

[73] Assignee: Timex Medical Products Corporation, Waterbury, Conn.

[21] Appl. No.: 309,667

[22] Filed: Oct. 8, 1981

Related U.S. Application Data

[63] Continuation-in-part of Ser. No. 249,779, Apr. 1, 1981, abandoned.

[51] Int. Cl.³ .............................................. G01K 1/18
[52] U.S. Cl. .................................... 374/165; 374/179; 374/185; 374/208
[58] Field of Search ............ 73/359 R; 136/233, 229, 136/232; 374/179, 185, 159, 163, 208, 209, 165; 338/28; 324/65 P

[56] References Cited

U.S. PATENT DOCUMENTS

| | | | |
|---|---|---|---|
| 2,186,707 | 1/1940 | Ray | 136/233 |
| 3,006,978 | 10/1961 | McGrath | 136/233 |
| 3,570,312 | 3/1971 | Kreith | 338/28 |
| 4,142,170 | 2/1979 | Blatter | 338/28 |
| 4,174,631 | 11/1979 | Hammerslag | 73/359 |
| 4,251,908 | 2/1981 | Carr | 136/233 |

FOREIGN PATENT DOCUMENTS 2339164 9/1977 France ................................. 73/359

Primary Examiner—Charles E. Frankfort
Assistant Examiner—Denis E. Corr
Attorney, Agent, or Firm—William C. Crutcher; Joseph A. Biela

[57] ABSTRACT

A probe of very low thermal mass and fast response for a digital electronic clinical thermometer using an extremely small temperature-responsive element with leads supported between coaxial tubular members. The temperature-responsive element, with adjacent lead portions is supported on at least one substantially hemispherical cup, also of low thermal mass adhered to the ends of the tubular members. Preferably a pair of hemispherically ended cups enclose a thermocouple junction and the associated lead portions, although a thermistor may also be used as the temperature-responsive element.

9 Claims, 5 Drawing Figures

PROBE FOR CLINICAL ELECTRONIC THERMOMETER

This is a continuation-in-part of my copending application, U.S. Ser. No. 249,779, filed Apr. 1, 1981, now abandoned, assigned to the present assignee.

BACKGROUND OF THE INVENTION

This invention relates generally to clinical electronic thermometers for measuring body temperature through the use of a probe. More particularly, it relates to an improved probe construction which is sealed, sanitary and has low thermal mass for quick response of the temperature-responsive element.

Probes for use with associated electrical circuitry for the measurement of body temperature and display of the temperature are well known. The majority of commercial devices are divided into two different types. One is based upon a thermistor element in the end of the probe which changes its resistance with temperature. A basic probe of this type is shown in U.S. Pat. No. 3,025,706—Oppenheim. The other type of probe which has been suggested for an electronic clinical thermometer is a thermocouple type probe, as exemplified in U.S. Pat. No. 4,174,631 issued Nov. 20, 1979 to Hammerslag.

Each type of probe has shortcomings with respect to reaching final body temperature due to the interaction between the probe and the local tissue. When any thermometer device is inserted, it locally cools the tissues, since the thermometer temperature is initially below body temperature. The time required to recover from this effect due to the interaction between the probe and the body is dependent not only on the probe design, but also on the blood circulation and other thermal characteristics of the tissue. The time required for a conventional glass clinical thermometer to reach final tissue temperature is in the neighborhood of 3 to 5 minutes. The primary factor determining this time lag is the thermal mass of the thermometer, which must be brought into substantial correspondence with the local tissue temperature. The local temperature of the tissue must itself also be brought back to where it was before the thermometer was inserted, due to its being cooled down by the thermometer.

Probe preheaters have been employed with thermistors to speed the response by raising the local temperature of the probe in the vicinity of the thermistor, as disclosed in the aforementioned patent to Oppenheim, as well as many other patents exemplified by the following:

| U.S. Pat. No. | Inventor | Issue Date |
| --- | --- | --- |
| 3,729,998 | Mueller et. al. | May 1, 1973 |
| 3,485,102 | E. N. Glick | December 23, 1979 |
| 3,893,058 | Keith | July 1, 1975 |
| 3,951,003 | Adams | October 28, 1975 |
| 4,166,451 | Salera | September 4, 1979 |
| 4,133,208 | Parlanti | January 9, 1979 |

Thermistor type probes have been usually favored for clinical thermometers over thermocouple probes, because the electrical circuitry is simpler and because there is no need for a reference temperature or compensation for the cold junction as there is in a thermocouple probe. Normally thermocouples have been used for temperature sensing devices measuring relatively high temperatures over a wide temperature range. This is because the voltage generated is a function of the difference between the hot junction and the cold junction, which favors a large temperature difference. However, with modern electronic techniques and abilities to amplify the low voltages and compensate for changes in cold junction temperature, thermocouple probes are now also practical for clinical temperature measurement.

The aforementioned Hammerslag U.S. Pat. No. 4,174,631 shows a thermocouple probe of low thermal mass achieved by supporting the thermal couple leads in a hollow tube of plastic material and causing the thermocouple junction to bridge the open end of the tube, so that the thin thermocouples support wires and junction are exposed for direct contact with the tissue of a patient. However, since the thermocouple leads are exposed, they may be subject to damage. Also because of the open end of the tube, the probe may become unsanitary due to entry of saliva or foreign matter. Another type of probe with exposed leads is shown in U.S. Pat. No. 4,250,751, issued Feb. 17, 1981 to Holzhacker et. al.

Constructions are known for high temperature type thermocouple probes with sealed ends as exemplified in the following patents:

| U.S. Pat. No. | Inventor | Issue Date |
| --- | --- | --- |
| 3,643,509 | Surinx | February 22, 1972 |
| 4,018,624 | Rizzolo | April 19, 1977 |
| 3,880,282 | Naumann | April 29, 1975 |

The problem with the above listed constructions in probes for clinical use is that the large thermal mass on the probe end renders it unsuitable for fast response.

Accordingly, one object of the present invention is to provide an improved probe suitable for clinical electronic temperature measurement.

Another object of the invention is to provide an improved probe having a temperature-responsive element and probe body of very low thermal mass and improved speed of response.

Another object of the invention is to provide an improved construction for an inexpensive probe for a clinical electronic thermometer.

DRAWINGS

The invention, both as to organization and method of practice, together with further objects and advantages thereof, will best be understood by reference to the following specification, taken in connection with the accompanying drawings, in which:

FIG. 1 is a perspective view of a digital electronic thermometer using the improved probe, FIG. 2 is an enlarged horizontal cross-section taken through the end of the probe, FIG. 3 is a view toward the end of the probe with a portion of the outer cup removed to show the lead arrangement, and FIGS. 4, 5 are cross-sectional views taken along lines IV—IV and V—V respectively of FIG. 2.

SUMMARY OF THE INVENTION

Briefly stated, the invention is practiced by providing a probe having thin coaxial tubular members of low thermal conductivity supporting lead conductors, at least substantially hemispherical cup member of low thermal mass closing the end of the probe and sealed to the ends of the tubular members, and a temperature responsive element supported on said hemispherical cup member and connected to the leads. Preferably there are inner and outer concentric cup members supporting the temperature-responsive element between them.

DESCRIPTION OF THE PREFERRED EMBODIMENT

Figure 1:
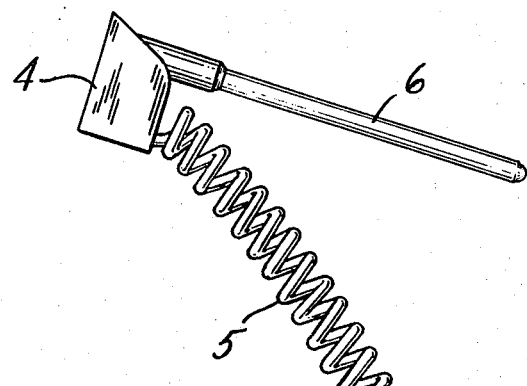
Figure 1:
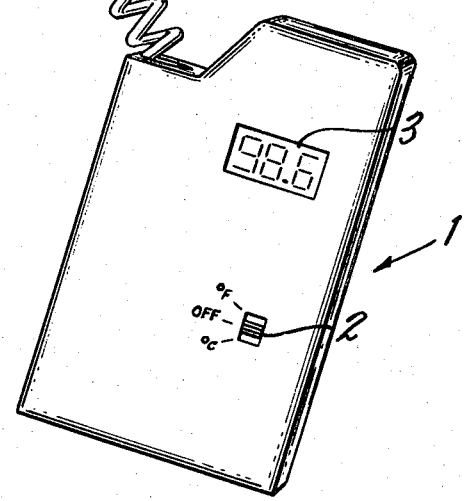

Referring now to FIG. 1 of the drawing, the probe is shown associated with a carrying case 1 which also houses the battery and electronic circuitry (not shown), operating switch 2 and a display 3 adapted to give a reading indication of the body temperature measured by the probe. The probe itself includes a handle 4 adapted to nest in the carrying case, a connecting spring-coil cord 5 attaching the internal circuitry with the thermocouple leads in the probe body 6 connected to the handle 4. Probe body 6 may be a permanent part of handle 4 or preferably is adapted for detaching from handle 4 for replacement with another probe. The method of attachment is not material to the present invention. When the probe is not in use, it and the coil cord are stored in the housing 1. A suitable arrangement for storing the probe and cord are disclosed in my copending application Ser. No. 249,760 for an improved "Electronic Thermometer with Integrally Housed Probe and Coil Cord", filed on Apr. 1, 1981 and assigned to the present assignee.

Figure 2:
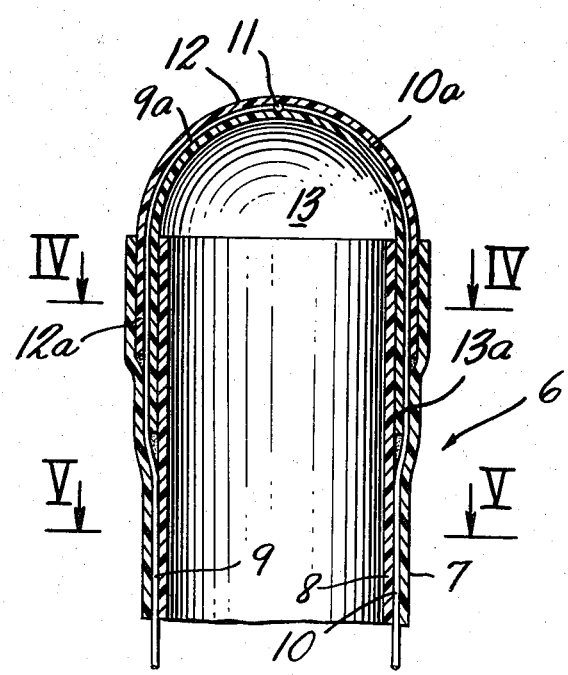

Reference to FIG. 2 shows that probe body 6 is comprised of an outer tubular member 7, a coaxial inner tubular member 8 carrying between them first and second leads 9, 10 leading to a temperature-responsive element 11. The outer tubular members 7, 8 are selected from material which has as low thermal conductivity as posible, in order to minimize the transfer of heat from the tip of the probe toward the handle. Thermal conductivities on the order of 0.0006 cal/sec/cm/sq. cm/deg. C. or less are used. Many plastic materials are suitable for this purpose, one suitable material being cellulose acetate. In addition to low thermal conductivity, the tubular members 7, 8 are made as thin as possible to reduce their thermal mass. The wall thickness used will depend somewhat upon whether the probe is intended to be disposable or not. Wall thickness on the order of 0.1 mm are suitable for disposable probes while greater wall thicknesses may be preferable for a permanent probe.

The leads 9, 10 are likewise selected to be of very low thermal mass. In the preferred embodiment, leads with diameters on the order of 0.1 mm have been found suitable. The temperature-responsive element 11 may comprise a thermocouple junction 11 of low thermal mass. The thermocouple metals may vary with the application but a suitable probe has been constructed using a type E thermocouple with a lead combination of Chromel-Constantan. In the case of thermocouple, the leads 9, 10 are, therefore, of dissimilar metals.

Alternatively, a thermistor may be used as the temperature-responsive element 11. A suitable thermistor is commercially available and comprises a small wafer with a volume less than 0.5 cubic millimeters, commercially obtainable from Gulton Industries. The thermistor can also be applied as a thin film.

Figure 5:
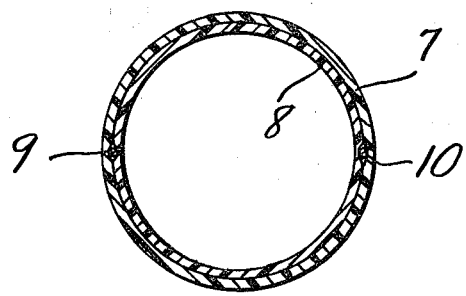

Reference to FIG. 5 which is a cross-section through the tubular members in the portion of the probe body connecting the probe tip to the handle shows that the tubular members conveniently support and insulate the very fragile leads 9, 10 between them, preferably in diametrically opposed locations as shown.

Figure 3:
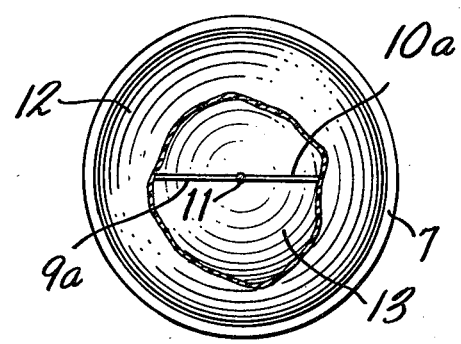

In accordance with the present invention, lead portions, designated 9a and 10a extending between the ends of the tubular members and the temperature-responsive element 11, as well as element 11 itself, are supported and protected by at least one substantially hemispherical cup member attached to and sealed to the ends of the tubular members. In the preferred embodiment, an outer hemispherical cup member 12 and a concentric inner hemispherical cup member 13 support the lead portions 9a, 10a and element 11 between them. Cups 12, 13 also serve to seal off the ends of the tubular members and prevent the entry of any foreign matter. Reference to FIG. 3 shows an end view of the probe end with the portion of the outer hemispherical cup member 12 broken away to illustrate how the leads are fully supported along the surface of the cup members.

The thermal conductivity of the material for cup members 12, 13 is not as critical as it is for the tubular members, since it is desirable to ensure that some averaging of local temperature variations in the vicinity of the thermocouple junction take place. The cup members may either be of plastic material, this being convenient since it also serves as an insulator, or can be of metal with a thin insulating coating. A suitable material is polycarbonate.

Figure 4:
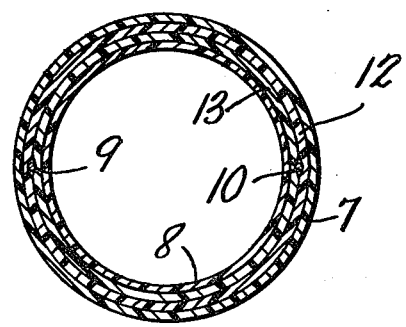

However, it is extremely important that the cup members 12, 13 be of low thermal mass while providing sufficient rigidity to support the fragile leads. To this end, the thickness of the cup members should be no greater than about 0.15 mm thick, but preferably on the order of 0.05 to 0.08 mm. The filling material should not significantly increase the thermal mass. A hemispherical shape is preferred to carry out this function. However, "hemispherical" includes also in its meaning shapes which approximately a hemispherical shape, such as truncated conical or parabolic shapes. The lower ends of the cups 12, 13 are provided with depending cylindrical skirt portion 12a, 13a, respectively. The skirt portions of the cup members are preferably sealed between the inner and outer tubular members as indicated in FIG. 2. This facilitates the carrying of the lower leads 9, 10 up to junction 11 at the tip of the probe on the tube axis. FIG. 4 shows the cross-section through the cups and tubes. An adhesive sealant is employed in all the spaces between members 7, 8, 12, 13. A suitable sealant for this purpose is silicone rubber sealant.

The above-described probe of low thermal mass provides a clean sanitary probe construction suitable for a clinical thermometer and having a fast response. A typical time constant obtained using the probe described above with a thermocouple junction is under 1 second, allowing a body temperature reading to be reached in about 3 to 5 seconds which is within 0.1° F. accuracy of the initial tissue temperature. In the case of the thermistor, the time constant is around 2 to 3 seconds allowing a body temperature reading to be reached in about 10 to 15 seconds. With thin film thermistors, these latter times may be improved.

While there has been described herein the preferred embodiment of the invention, it is desired to cover in the appended claims all such modifications as fall within the true spirit and scope of the invention.

I claim:

1. A probe for an electronic clinical thermometer comprising:

a plastic probe body comprising inner and outer hollow coaxial tubular members of material having a low thermal conductivity and having thin walls of low thermal mass, a probe tip comprising two plastic cup members each having a substantially hemispherical shape and having a thin wall of low thermal mass, said cup walls not exceeding approximately 0.15 mm in thickness, a thermistor of low thermal mass, and a pair of leads of low thermal mass disposed between and supported by the walls of said tubular members and also disposed between and supported by the walls of said cup members and connected to said thermistor at the end of the probe tip between the cup members, said cup members received between the walls and sealingly connected at the ends of said tubular members and closing off said tubular members at the end of the probe body.

2. A probe according to claim 1 in which said two cup members are inner and outer concentric cup members and wherein said thermistor and portions of said leads are supported therebetween.

3. A probe according to claim 2, wherein said inner and outer cup members include depending inner and outer skirt portions respectively, interposed between the inner and outer tubular members.

4. A probe in accordance with claim 1, wherein said probe members have wall thicknesses on the order of 0.1 mm.

5. The combination according to claim 2, wherein said leads are disposed substantially diametrically opposed along the tubular members and extend between said cup members and connected to said temperature-responsive element substantially along the tube axis at the tip of said probe.

6. The combination according to claim 1, wherein said leads are on the order of 0.1 mm in diameter, said thermistor is at a junction of said leads, and wherein said tubular members have thicknesses on the order of 0.1 mm.

7. The combination according to claim 1, wherein said thermistor is less than 0.5 cubic millimeters in volume.

8. The combination according to claim 1, wherein said cup member has skirt portions nested within said tubular members and sealingly connected thereto.

9. A probe for an electronic clinical thermometer comprising:

a probe body comprising inner and outer coaxial tubular members having thin contiguous walls of low thermal mass on the order of 0.1 mm in thickness, a probe tip comprising inner and outer cup members having substantially hemispherical shapes and depending skirt portions nested between the inner and outer tubular members at the end of the probe, said cup members having thin contiguous walls of lower thermal mass, not exceeding 0.15 mm in thickness a temperature-responsive element of low thermal mass, a pair of leads disposed between and supported by the walls of said tubular members in substantially diametrically opposed locations and extending between and supported by said cup members, said leads being connected to said temperature-responsive element which is supported by the cup members at the end of the probe tip, the skirt portions of said cup members being sealingly connected to said tubular members at the end of the probe body.

* * * * *